O. SAGE.
Cheese Vat.
No. 25,676. Patented Oct. 4, 1859.
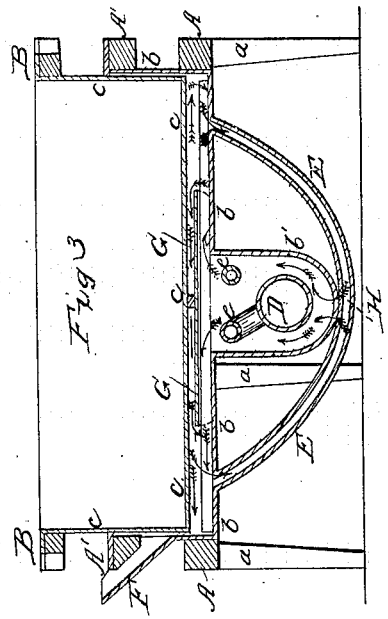
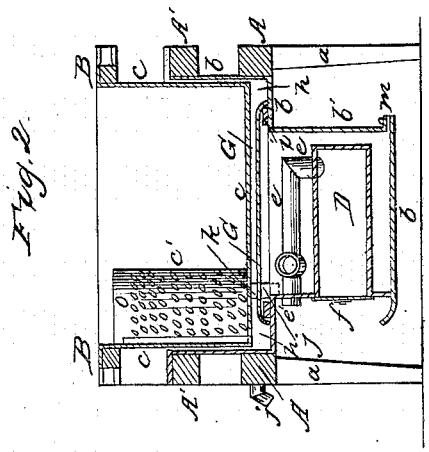
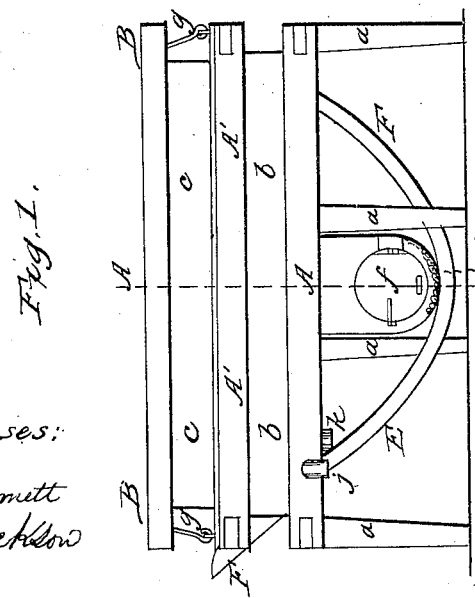
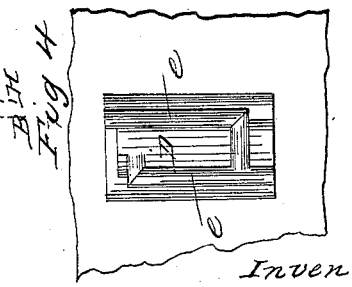
Witnesses:
Isaac P. Bennett
J. H. Dickson
Inventor:
O. Sage

UNITED STATES PATENT OFFICE.

O. SAGE, OF WELLINGTON, OHIO.

CHEESE-VAT.

Specification of Letters Patent No. 25,676, dated October 4, 1859.

*To all whom it may concern:*

Be it known that I, O. SAGE, of Wellington, in the county of Lorain and State of Ohio, have invented a certain new and useful Improvement in Cheese-Vats; and I do hereby declare that the following is a full and exact description thereof, reference being had to the accompanying drawings, and to the letters of reference marked thereon, forming a part of this specification.

Figure 1 is a side view of my improved vat. Fig. 2 is a section in line A, B, Fig. 1. Fig. 3 is a section through the center of the vat and in a line at right angles with the line A, B, Fig. 1, and Fig. 4 is a top view of the furnace and smoke pipe.

A, in the accompanying drawings, represents the main frame, which is supported on legs $a$.

To the inside of the main frame A, is attached the water box $b$, which is provided with a wooden frame A′. The water box $b$, is curved down near the center as shown at $b'$, Figs. 2 and 3, so as to afford sufficient space for the furnace D, and smoke pipe $e$, below the main bottom of the water box $b$. A curved pipe E, communicates with each end of the water box $b$, and also with the bottom of the curved portion $b'$, as shown at H, Fig. 3.

B, is the frame of the milk box $c$, which is placed in the water box $b$, as shown in Fig. 3, and to the bottom of which is attached an equalizer or fender plate G, as shown in Figs. 2 and 3. The milk box $c$ has a curd strainer $c'$.

The furnace D, is provided with a door $f$, for the insertion of fuel, &c. while the smoke pipe $e$, has an extension $e'$, for the purpose of affording a ready means of cleaning it out.

The operation is as follows, viz.—The milk box $c$, is placed in the water box $b$, and fastened by means of the hooks $g$, $g$, when the desired quantity of milk is turned in. Water is then turned into the spout F, of the water box $b$, until the furnace D, and smoke pipe $e$, is entirely covered and until the water rises around the milk box $c$, as high as the milk in the box. The door $f$, of the furnace D, is now opened and a small quantity of fuel placed in the furnace and ignited, when the water as it becomes heated rises around the furnace D, and smoke pipe, and as it comes in contact with the equalizer or fender plate G, it is turned toward the ends of the vat until it reaches the ends of the fender plate when it rises and comes in direct contact with the bottom of the milk box $c$, as indicated by red arrows.

As the hot water rises from the curved portion $b'$ of the water box $b$, the water that has imparted its heat to the milk descends from the ends of the water box through the pipe E, and enters at the bottom of the curved portion $b'$, and below the furnace D, and smoke pipe $e$, to be re-heated.

It will thus be seen that by my peculiar arrangement of the furnace and smoke pipe, that all, or nearly all, of the heat is utilized, while at the same time all danger of any portion of the milk being over heated is guarded against and prevented by the use of the equalizer or fender plate G, which prevents the highly heated water from coming at once in contact with the bottom of the milk box.

The sides of the equalizer or fender plate are provided with ledges $h$, which may rest on the bottom of the water box $b$, or wooden pieces $i$, may be used to support the milk box, or if preferred the milk box could be supported by projections resting on the framing A′.

When it is desired to draw off the whey from the curd, the pipe $k$, is unstopped, when the whey passes through the strainer $c'$, and down through pipe $k$. The water can be drawn off through pipe $f$, or by turning a cock through the outlet pipe $m$, in the bottom of $b'$.

The legs attached to the strainer end, may be made shorter than the others so as to allow the vat being tipped to facilitate the drawing off of the whey.

The motion of the water while being heated is indicated by red arrows in Fig. 3.

It will be observed that in addition to the advantages resulting from my peculiar construction and arrangement of furnace and smoke pipe as above referred to, that I have free access to both by simply lifting off the milk box.

I am aware that a patent was granted to H. A. Roe on the 12th of Dec. 1854, for an improved cheese vat, and I am also aware that in the rejected and withdrawn application of E. Slaght, 1855, an open bottomed water box is to be found. I do not therefore wish to be understood as claiming what has been secured to Roe, in his said patent nor what is to be found in said Slaght's withdrawn application, but Having described my invention, what I claim and desire to secure by Letters Patent, is:—

The combination of the furnace D, and smoke pipe e, with the open and curved bottom b′, of the water box b, pipe E, equalizer G, and milk box c, said parts being constructed, arranged, combined and operating in relation to each other substantially as and for the purposes set forth.

O. SAGE.

Witnesses:
 ISAAC BENNETT,
 C. S. FOOTE.